(12) United States Patent
Rapowitz et al.

(10) Patent No.: US 12,223,453 B2
(45) Date of Patent: Feb. 11, 2025

(54) METHOD FOR SCORING CONFIDENCE OF AN ALGORITHMICALLY PROPOSED RISK

(71) Applicant: Capital One Services, LLC, McLean, VA (US)

(72) Inventors: Samuel Rapowitz, Roswell, GA (US); Joshua Peters, Charlottesville, VA (US); Haytham Yaghi, Oakton, VA (US); Evelyn Burke, Reston, VA (US); Caroline Williams, New York, NY (US); Shabnam Kousha, Washington, DC (US); Maxwell Gotsch, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 79 days.

(21) Appl. No.: 17/727,109

(22) Filed: Apr. 22, 2022

(65) Prior Publication Data

US 2023/0342691 A1    Oct. 26, 2023

(51) Int. Cl.
*G06Q 10/0635* (2023.01)
*G06N 20/00* (2019.01)

(52) U.S. Cl.
CPC ......... *G06Q 10/0635* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,312,549 B2 | 11/2012 | Goldberg et al. | |
| 10,909,630 B2 | 2/2021 | Baxter | |
| 2019/0095500 A1* | 3/2019 | Pandey | G06F 16/288 |
| 2019/0197444 A1 | 6/2019 | Smith | |
| 2021/0081566 A1 | 3/2021 | Broudou et al. | |
| 2021/0201412 A1* | 7/2021 | Goh | G06Q 10/10 |
| 2021/0248319 A1* | 8/2021 | Boston | G06F 40/284 |
| 2022/0207443 A1* | 6/2022 | Sarkar | G06Q 10/0635 |
| 2022/0237398 A1* | 7/2022 | Asermely | G06F 3/0483 |

FOREIGN PATENT DOCUMENTS

WO    WO-2022221679 A1 * 10/2022 ............. G06F 40/20

OTHER PUBLICATIONS

Gerald A. Klein, Jr., Cross-Cutting Risk Framework: Mining Data for Common Risks Across the Portfolio, 2017 IEEE (Year: 2017).*

* cited by examiner

*Primary Examiner* — Jerry O'Connor
*Assistant Examiner* — Matthew H Divelbiss
(74) *Attorney, Agent, or Firm* — Sterne, Kessler, Goldstein & Fox P.L.L.C.

(57) ABSTRACT

Disclosed herein are system, method, and computer program product embodiments for training and deploying a machine learning model to generate an assessment of risks and mitigations in response to a novel initiative request. After generating labeled data from a corpus of prior risk assessments, a machine learning model may be trained to programmatically generate a risk assessment in response to a novel initiative request. A risk auditor may subsequently review the risk assessment generated using the machine learning model to provide various feedback reflecting the accuracy of the risks and mitigations. The machine learning model may then be retrained based on the feedback provided by the risk auditor to provide more accurate risks and mitigations in response to future initiatives.

20 Claims, 12 Drawing Sheets

Overview

| | Total Initiatives 204 | Total Risks Identified 206 | Total Mitigations 208 | Time Saved 210 |
|---|---|---|---|---|
| | 12 | 348 | 348 | 560hrs |

All Initiatives — 212

| RISKS IDENTIFIED ⇅ | PRODUCT NAME ⇅ — 214 | SUBMITTER(S) ⇅ — 216 | SUBMISSION DATE ⇅ — 218 | |
|---|---|---|---|---|
| 120 | ISX Post LSRP Mobile | Jane Doe, Joseph Powell | 4/18/2021 | ••• |
| 89 | Device Confidence: AT... | Jane Doe, Kirsten Jacobs | 3/18/2021 | ••• |
| 51 | Customer Linking | Jane Doe, John Jacobs | 2/18/2021 | ••• |
| 30 | Customer Utilities | Jane Doe, Craig Donnelly | 1/16/2021 | ••• |
| 28 | Customer Management... | Jane Doe, Sri Veshneda | 12/18/2020 | ••• |
| 10 | Unbound VCN | Jane Doe, Sarah Ng | 12/18/2020 | ••• |
| 10 | Autofill | Jane Doe, Camille Martinez | 12/18/2020 | ••• |
| 10 | Clorox | Jane Doe, Edgar Lee | 12/18/2020 | ••• |

Rows per page: 8 ▾    1-8 of 12  < >

MITIGATIONPRO
- Overview
- Submit
- Review
- Settings

MITIGATIONPRO

- Overview
- Submit
- Review
- Settings

Review

EASE VCN Web Create

Summary

COF is enabling users to create VCNs on Ease Web to accomplish increase spend and decreased fraud as part of Don's OKRs. The scope of the NPMIG review includes Ease VCN Create functionality and will measure the impact of decreased fraud and increased spend as the controlled rollout continues.

| TOTAL RISK IDENTIFIED | TOTAL MITIGATIONS |
|---|---|
| 26 | 26 |

230 / 232

SUBMIT + Jane Doe

Risks & Mitigations Summary

FULL REPORT

| ASSESSMENT ID ⇵ | TYPE ⇵ | RISK TYPE ⇵ | DESCRIPTION ⇵ | MITIGATION ⇵ |
|---|---|---|---|---|
| RID-064284 | Impact | Compliance | ADA | There is formal guidance (ADA Title III and WCAG 2.1) that digital properties should include accommodations to be fully accessible to individuals with disabilities. The project team must work with the Digital Accessibility (DA) team to ensure digital properties that are part of this initiative are fully accessible to individuals with disabilities so that they may participate fully. |
| RID-064285 | Impact | Compliance | FFIEC | The Authentication Guidance ("MFA") requires that any electronic application that permits access to sensitive customer or financial data must have appropriate authentication and layered security controls. The Guidance also requires that a formal risk assessment is completed prior to implementation and annually thereft...[READMORE] |
| RID-064286 | Risk | Compliance | Reg-Z Disputes | The product team should ensure the VCN/PAN is configured correctly by working with the VCN team to get a list of configuration requirements. The level of risk associated with this issue is typically Low because the VCN team can be engaged to help proactively remediate this risk. |
| RID-064287 | Impact | Compliance | CaCPA | If this initiative will result in the NEW data being introduced into our data ecosystem, the Product Team must reach out to the Data Ethics and Privacy Office (DEPO) to ensure it has been accounted for in their data inventory. |

234 / 236 / 238 / 240 / 242

233

202

200E

M MITIGATIONPRO | Review | 🔍 △ (SUBMIT +) Neo Matrix 👤

- Overview
- Submit
- ► Review
- Settings

EASE VCN Web Create

Summary

COF is enabling users to create VCNs on Ease Web to accomplish increase spend and decreased fraud as part of Don's OKRs. The scope of the NPMIG review includes Ease VCN Create functionality and will measure the impact of decreased spend and increased spend as the controlled rollout continues.

| | TOTAL RISK IDENTIFIED | TOTAL MITIGATIONS |
|---|---|---|
| | 26 | 26 |

(MODIFY) (FULL REPORT ⬇)
246

Risks & Mitigations Summary

| ASSESSMENT ID ⇅ | TYPE ⇅ | RISK TYPE ⇅ | DESCRIPTION ⇅ | MITIGATION ⇅ |
|---|---|---|---|---|
| RID-064284 | Impact | Compliance | ADA | There is formal guidance (ADA Title III and WCAG 2.1) that digital properties should include accommodations to be fully accessible to individuals with disabilities. The project team must work with the Digital Accessibility (DA) team to ensure digital properties that are part of this initiative are fully accessible to individuals with disabilities so that they may participate fully. |
| RID-064285 | Impact | Compliance | FFIEC | The Authentication Guidance ("MFA") requires that any electronic application that permits access to sensitive customer or financial data must have appropriate authentication and layered security controls. The Guidance also requires that a formal risk assessment is completed prior to implementation and annually thereaft...[READMORE] |
| RID-064286 | Risk | Compliance | Reg-Z Disputes | The product team should ensure the VCN/PAN is configured correctly by working with the VCN team to get a list of configuration requirements. The level of risk associated with this issue is typically Low because the VCN team can be engaged to help proactively remediate this risk. |
| RID-064287 | Impact | Compliance | CaCPA | If this initiative will result in the NEW data being introduced into our data ecosystem, the Product Team must reach out to the Data Ethics and Privacy Office (DEPO) to ensure it has been accounted for in their data inventory. |

FIG. 2G

METHOD FOR SCORING CONFIDENCE OF AN ALGORITHMICALLY PROPOSED RISK

CROSS-REFERENCE TO RELATED APPLICATIONS

This application is related to U.S. patent application Ser. No. 17/727,081 titled "Method for Determining Risks and Mitigations From Project Descriptions," filed herewith, which is herein incorporated by reference in its entirety.

BACKGROUND

Organizations employ risk analysis to vet the impact of future changes. For example, organizations may change existing technical systems behaviors and architectures. This potentially create problems, issues, and risks. The development and release of new products presents another form of change that may induce risks. Marketing initiatives and a wide-array of non-technical undertakings may also create risk for organizations.

A risk may be the likelihood that negatively impactful event may occur, and an impact may be additional consequences of the event occurring. Risks may include both residual risks and inherent risks. Inherent risk is the amount of risk that exists in the absence of controls. Residual risk is the amount of risk that remains after the application of controls. Organizations may perform risk analysis to determine risks created by a potential change and appropriate actions or other mitigating steps to minimize risks and impacts. Risk-analysis techniques may further ensure compliance with a variety of regulations, laws, and other relevant forms of oversight.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 2A is an example screen display of a summary screen in a risk initiative mitigation interface, according to some embodiments.

FIG. 2E is an example screen display of a results screen provided to an intent requestor in a risk initiative mitigation interface, according to some embodiments.

FIG. 2G is an example screen display of a review screen provided to a risk advisor or subject-matter expert in a risk initiative mitigation interface, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
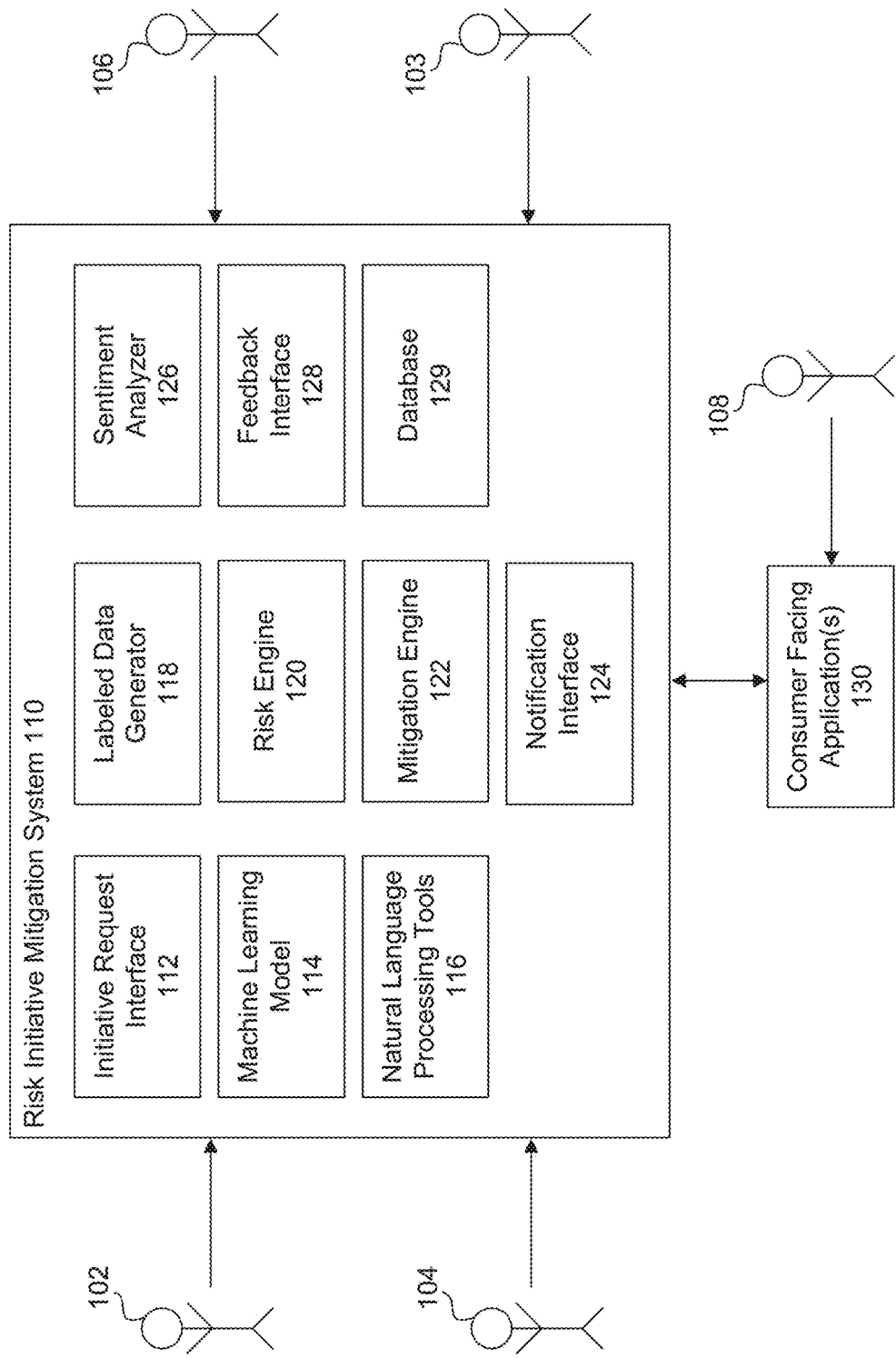
FIG. 1 is a block diagram of an environment that includes a risk initiative mitigation system, according to some embodiments.

Provided herein are system, apparatus, device, method and/or computer program product embodiments, and/or combinations and sub-combinations thereof, for training and deploying a machine learning model to generate an assessment of risks and mitigations in response to a novel initiative request. After generating labeled data from a corpus of prior risk assessments, a machine learning model may be trained to programmatically generate a risk assessment in response to a novel initiative request.

Generally speaking, organizations face risks in their operation, but especially when changes are made. For example, risks may arise when changes occur in existing technical systems or when the organization develops and releases new products. Accordingly, organizations may exercise great care when changing their technical infrastructure. This is especially true when an organization is heavily regulated or stores sensitive data in its technical systems. Organizations may employ risk analysis techniques to vet the impact of such changes. These techniques may determine the risks created by any change and mitigations that may need to take place to minimize the determined risks and impacts.

The types of changes that create risk may vary and differ across organizations. For example, development teams may propose the creation of a new product or add new features to existing products. Technical teams may propose changes to computer architectures, e.g., transitioning between cloud-based platforms or moving an internally hosted applications to the cloud. Changes may be made to the hardware (e.g. workstations, laptops, mobile devices, printers, etc.) and software used by members of an organization. An organization may change how it stores and deploys business-relevant data. Organizations may change internal operations to create additional risks, e.g., advancing a new marketing initiative, modifying internal organizational structure, pursuing a business opportunity, etc.

Organizations scrutinize risk and changes for numerous reasons. For one, organizations may have to comply with laws, regulations, and other forms of governmental oversight. Banks may need to rigorously comply with regulations promulgated by the Federal Reserve and other government agencies. Companies may need to design applications that are compliant with the Americans with Disabilities Act (ADA), Section 508 of the Rehabilitation Act, other accessibility or usability standards. Public companies may need to ensure compliance with the Sarbanes-Oxley Act and other aspects overseen by the Securities Exchange Commission ("SEC"). Organizations offering health services and housing health-related data may need to behave in accordance with Health Insurance Portability and Accountability Act of 1996 (HIPAA) regulations. Education-related organizations may need to comply with Family Educational Rights and Privacy Act (FERPA) regulations. Organizations may face other risks when implementing changes, e.g., potential fines, reputational damage, financial risks, missed business opportunities, etc.

To ensure compliance with regulations and mitigate potential risks, organizations may employ risk analyses techniques to analyze, approve, and govern any new initiatives proposed within the organization. In such a risk approval system, when an individual within an organization (referred to below as an "intent requestor") conceives of a new product, change to a technical system, or other new initiative, the intent requestor may create an official request to review the initiative ("referred to below as an "initiative request") to ascertain whether the initiative creates risks and/or implicates any regulations. The risk-approval routine may then generate an assessment of the risks created by the new initiative to determine whether and/or under what conditions the initiative may proceed.

Risk advisors may review the initiative request to determine the risks presented to the organization by the initiative request. The advisors may have expertise in a specific field of risk (e.g., financial regulations, data security, marketing, etc.) and may be responsible for vetting risks in these particular subject areas. The risks may fall into categories—e.g., compliance, legal, operational, etc. The team of risk advisors may determine appropriate actions to take to address these risks (referred to below as "mitigations").

Mitigations may differ depending on the risk, the organization, and other factors. Generally speaking, a mitigation may be an action that needs to be taken to address the risk and/or limit potential impacts of the risk. For example, a mitigation may entail removing portions of the initiative request prior to proceeding with implementation, leveraging particular technical services in tandem with development, proposing particular technical courses for implementation (e.g., encryption or other data security technique), and other suitable actions. In some instances, the initiative request may need to be revamped and rewritten to address the risks and mitigations and resubmitted. For some mitigations, the team of risk advisors may determine an expert (referred to below as "a subject-matter expert") to consult with on individual mitigations to get additional information, further tailor the implementation of the initiative, and otherwise reduce the impacts of the risk.

An organization may standardize the information in an initiative request. For example, an initiative request may include an intake form, a number of questions and answers, and a slide presentation. The intake form may include various qualitative, text-based fields provided by the intent requestor. The questions and answers may include requests for information pertinent to risk analysis with answers provided by the intent requestor (again, qualitatively). The slide presentation may be assembled by the intent requestor to demonstrate the proposed initiative to the risk advisors in a concise, digestible, and presentable form.

In legacy systems, the risk mitigation process may be extremely time-consuming and manually intensive for both an intent requestor and the risk advisors. For the intent requestor, the very existence of the process presents a bottleneck to proceeding with proposed technical changes. The intent requestor may wait days, weeks, or months for a team of risk advisors to review the initiative request, generate a risk assessment, and approve the initiative. Under such circumstances, development may need to be delayed until a response is received or changes may be made after the fact to a received assessment. Moreover, time spent creating the initiative request and engaging with risk advisors and other individuals in the organization detracts from an intent requestor's other duties.

For risk advisors, the process is also time consuming and fraught with difficulties. Risk advisors may have a limited understanding of the technical systems implicated by the initiative request. Thus, determining the risks may prove difficult. Ascertaining the consumer facing applications affected by the initiative may be beyond a risk advisor's knowledge. Risk advisors may face redundant initiative requests. Risk advisors may not know the appropriate subject-matter expert pertinent to mitigations and consumer facing applications.

Accordingly, a technical benefit over such legacy systems may be realized by a providing a system of centralized control that guides the creation, review, and approval of initiative requests. In this fashion, risks and mitigations may be standardized and addressed uniformly. An initiative request interface may save intent requestors time when submitting the initiative request, enforce error checking on the materials to ensure compliance with requirements, and provide a secure repository to store the information throughout the risk mitigation process. The standardization provided by the initiative request interface also provides the ability to aggregate and track the information generated during risk mitigation processes over history, which as discussed below may further optimize the generation of risk assessments.

Another technical benefit over legacy systems may be obtained by training a machine learning model to perform risk-advisor functions based on a corpus of prior risk assessments. By transforming these inputs (e.g., the intake form, the questions and answers, and slide presentation) and previously generated outputs (e.g., risks and mitigations) into a format that can be used to train a machine learning model, the system may provide immediate results in an initiative request process. The system may perform textual analysis of a novel initiative request and based on the semantic analysis, determine relevant risks and mitigations to the never-before-seen data in the new initiative request using the trained data.

This capacity for immediacy obviates the need for an intent requestor to delay in implementing the initiative—instead, the intent requestor receives results immediately. This simultaneously eases the burden on risk advisors to review similar or redundant initiative requests. Instead, a risk advisor may simply double check the machine learning model's results to ensure their accuracy and sign-off on the risk assessment.

A further technical benefit over legacy systems may be obtained by receiving relevancy indicators from the intent requestor. The relevancy indicator indicates the relevance of each received risk and may then be used to further train the machine learning model to deliver more accurate results in response to future initiative requests.

A further technical benefit may be realized by employing a trainer (referred to below as a "risk auditor") to review the results of the generated risks and mitigations to ensure their accuracy. The risk auditor may provide various feedback about the accuracy of the risks and mitigations. The machine learning model may then be retrained based on the feedback provided by the risk auditor to provide more accurate risks and mitigations in response to future initiatives.

A further technical benefit may be realized by analyzing consumer facing applications deployed by an organization to determine the consumer facing applications potentially affected by an initiative request. The relevant consumer facing applications may be associated with particular risks and/or mitigations generated by the risk assessment process. The machine learning model may further be trained with this knowledge of the consumer facing applications deployed by the organization to determine more robust risks unique to these technical systems.

FIG. 1 is a block diagram of an environment that includes a risk initiative mitigation system, according to some embodiments. Environment 100 may include intent requestor 102, risk advisor 103, subject-matter expert 104, risk auditor 106, customer 108, risk initiative mitigation system 110, initiative request interface 112, machine learning model 114, natural language processing tools 116, labeled data generator 118, risk engine 120, mitigation engine 122, notification engine 124, sentiment analyzer 126, feedback interface 128, database 129, and consumer facing applications 130.

Intent requestor 102 may be an individual or entity within a business, organization, or other suitable group that conceives of new initiative. Intent requestor 102 may be a human being, but intent requestor 102 may also be an artificial intelligence construct. Intent requestor 102 may create a request to review an initiative to ascertain whether the initiative creates risks and impacts. To access risk initiative mitigation system 110, intent requestor 102 may employ various computing devices, e.g., desktop workstation, laptop or notebook computer, netbook, tablet, smart phone, smart watch or other wearable, appliance, etc. that connects to a network or combination of networks including the Internet, a local area network (LAN), a wide area network (WAN), a wireless network, a cellular network, or various other types of networks as would be appreciated by a person of ordinary skill in the art.

Risk advisor 103 may be an individual in an organization that reviews an initiative request to determine the risks presented to the organization by the initiative request. Risk advisor 103 may be an expert in a specific field of risk (e.g., financial regulations, data security, marketing, etc.). In an embodiment, risk advisor 103 may view a risk assessment (mitigations, risks, etc.) programmatically generated by risk initiative mitigation system 110 using machine learning model 114. In this embodiment, risk advisor 103 may only need to verify the accuracy of the generated risk assessment and/or sign-off on the results. To access risk initiative mitigation system 110, risk advisor 103 may employ various computing devices, e.g., desktop workstation, laptop or notebook computer, netbook, tablet, smart phone, smart watch or other wearable, appliance, etc. that connects to a network or combination of networks including the Internet, a local area network (LAN), a wide area network (WAN), a wireless network, a cellular network, or various other types of networks as would be appreciated by a person of ordinary skill in the art.

Subject-matter expert 104 may be an individual in an organization that intent requestor 102 consults regarding a mitigation or an individual that is otherwise responsible for the mitigation. Subject-matter expert 104 may be an expert in a specific field of risk (e.g., financial regulations, data security, marketing, etc.) and may work with intent requestor 102 to mitigate the impacts of a particular risk created by the initiative request. To access risk initiative mitigation system 110, subject-matter expert 104 may employ various computing devices, e.g., desktop workstation, laptop or notebook computer, netbook, tablet, smart phone, smart watch or other wearable, appliance, etc. that connects to a network or combination of networks including the Internet, a local area network (LAN), a wide area network (WAN), a wireless network, a cellular network, or various other types of networks as would be appreciated by a person of ordinary skill in the art.

Risk auditor 106 may be an individual in an organization tasked with reviewing the results of a machine learning model to verify the accuracy of the risks and mitigations and with retraining the model with further feedback. Risk auditor 106 ensures the accuracy of the results of the machine learning model and improves quality of results over time. In one embodiment, risk auditor 106 may provide a relevancy indicator that quantitatively represents the relevance or irrelevance of the mitigation and risks to the initiative request. In one embodiment, risk auditor 106 may provide feedback in the form of an accuracy indicator that quantifies the success of risk engine 120 and mitigation engine 122 in identifying a complete and accurate set of risks and mitigations created by the initiative request. The received accuracy indicator may further be accompanied by additional labeling of data by risk auditor 106. For example, risk auditor 106 may tag particular risks and mitigations as being accurate or inaccurate. Risk auditor 106 may include in the feedback a severity indicator that indicates the gravity of an error made by machine learning model 114. To access risk initiative mitigation system 110, risk auditor 106 may employ various computing devices, e.g., desktop workstation, laptop or notebook computer, netbook, tablet, smart phone, smart watch or other wearable, appliance, etc. that connects to a network or combination of networks including the Internet, a local area network (LAN), a wide area network (WAN), a wireless network, a cellular network, or various other types of networks as would be appreciated by a person of ordinary skill in the art.

Customer 108 may use the technical systems of an organization, e.g., an individual or entity that accesses consumer facing applications 130. One example of a risk faced by an organization might be a loss of goodwill in customer 108 in response to change made to an application in consumer facing applications 130. To access consumer facing applications 130, customer 108 may employ various computing devices, e.g., desktop workstation, laptop or notebook computer, netbook, tablet, smart phone, smart watch or other wearable, appliance, etc. that connects to a network or combination of networks including the Internet, a local area network (LAN), a wide area network (WAN), a wireless network, a cellular network, or various other types of networks as would be appreciated by a person of ordinary skill in the art.

Risk initiative mitigation system 110 may be leveraged by an organization to perform risk mitigation techniques and analyze initiative requests. For example, intent requestor 102 may conceive of a change to an existing product and seek approval to that proceed with the change. Risk initiative mitigation system 110 may allow intent requestor 102 to create an initiative request by uploading appropriate information to the system. In an embodiment, risk initiative mitigation system 110 may train a machine learning model using a corpus of prior risk assessments to programmatically ascertain the risks and mitigations associated with a novel initiative request. Risk initiative mitigation system 110 may provide a summary of the results to risk advisor 103 to check the accuracy of the results and receive sign-off on the risk assessment. Risk initiative mitigation system 110 may then allow subject-matter expert 104 to resolve the risk and/or reduce potential impacts. Risk initiative mitigation system 110 may include initiative request interface 112, machine learning model 114, natural language processing tools 116, labeled data generator 118, risk engine 120, mitigation engine 122, notification engine 124, and database 126.

Initiative request interface 112 may be provided within risk initiative mitigation system 110 to receive an initiative request from intent requestor 102, provide results to intent requestor 102, subject-matter expert 104, and perform other suitable functions related to the risk mitigation process. For example, initiative request interface 112 may allow intent requestor 102 to create an initiative request in a web interface by submitting an intake form, answer of number of questions, and providing a slide presentation. The intake form may include various qualitative, text-based fields provided by the intent requestor. The questions and answers may include requests for information pertinent to risk analysis with answers provided by the intent requestor (again, qualitatively). The slide presentation may be assembled by the intent requestor to demonstrate the proposed initiative to the risk advisors in a concise, digestible, and presentable form. Initiative request interface 112 may allow risk advisor 103 to review and sign-off on the algorithmically generated risk assessment. Initiative request interface 112 may alert subject-matter expert 104 about a generate risk assessment that creates a risk in their area of expertise and receives additional modification to the risk assessment. Initiative request interface 112 may also receive feedback from risk auditor 106 about generated risks and assessments. This feedback may be used to train machine learning model 114 to generate more accurate results. Various functions of initiative request interface 112 are described in further detail below with reference to screen displays 200A-200G.

Machine learning model 114 may be trained using a corpus of prior risk assessments to system to programmatically perform risk-advisor functions. With the inputs (e.g., intake forms, answers to questions, and slide presentations) and outputs (e.g., risks and mitigations), machine learning model 114 may be trained to provide immediate results in an initiative request process. Machine learning model 114 may be a mathematical model built using the inputs and outputs. Machine learning model 114 may be implemented using a variety of approaches within the context of this disclosure, e.g., machine learning model 114 may be a neural network or naïve Bayes classifier, a binary classification model, multiclass classification, or regression machine learning model. As discussed below, machine learning model 114 may employ both supervised and unsupervised learning techniques to generate more accurate and optimized risk assessments to a novel initiative requests.

Natural language processing tools 116 may be leveraged to perform textual analysis of a novel initiative request. Based on the semantic analysis, natural language processing tools 116 may, in tandem with machine learning model 114, determine relevant risks and mitigations for a novel initiative request. Natural language processing tools 116 may also be used by labeled data generator 118 to programmatically generate labeled data from unlabeled data in the corpus of previous risk assessments.

Labeled data generator 118 may be used to transform input materials—e.g., the intake form, the questions and answers, and slide presentation—into a form that can be ingested by machine learning model 114. Labeled data generator 118 may also transform previously generated risks and mitigations into a format that can be ingested by machine learning model 114. For example, labeled data generator 118 may divide the corpus of materials into appropriate data sets, e.g., a training data set, a validation data set, and a test data set. In one embodiment, labeled data generator 118 may allow a user to tag samples or groups of samples within the retrieved materials with labels as a form of supervised learning. For example, labeled data generator 118 tag a particular input or output or group of inputs or outputs as being accurate or inaccurate. Labeled data generator 118 may tag a particular input or output group with a severity indicator. In another embodiment, labeled data generator 118 may employ natural language processing tools 116 to perform text-analyses and determine conclusions about the input or output group. This technique allows labeled data generator 118 to programmatically generate labeled data from the unlabeled data to further prepare the corpus of data for ingestion by machine learning model 114.

Risk engine 120 may determine risks applicable to a received intent request. Risks may be compliance, legal, or operational risks. Risks may include both residual risks (e.g., the amount of risk that remains after the application of controls) and inherent risks (e.g., the amount of risk that exists in the absence of controls). Risk engine 120 may further determine impacts of the identified risks. For example, intent requestor 102 could submit an initiative request to risk initiative mitigation system 110 and receive risks back such as: "A Fair Lending Risk that could lead to fines and penalties," "Potential that the customer may be harmed or miss out on a benefit due to their inability to understand communications that were not provided in their language or preference," "CCPA Impact: there is a possibility that data collected and used part of the build and launch of this initiative does not currently fit within existing business purposes", "FFIEC Guidance on Authentication in an Internet Banking Environment Risk," "Risk of Trademark Infringement," and many other suitable risks. In one embodiment, risk engine 120 may use a pre-generated list of the risks and associate each risk with a risk identifier. The risk identifier may be used to associate the risks with mitigations, subject-matter experts, track analytics about the various risks, etc.

Mitigation engine 122 may determine mitigations applicable to risks. For example, mitigation may involve intent requestor 102 consulting with subject-matter expert 104 to get additional information, change the proposed implementation, or clear the risk. In other examples, mitigations may involve removing particular features of the intent request, leveraging particular technical services, employing technical approaches during implementation (e.g., encryption or other data security technique), etc. For example, intent requestor 102 could submit an initiative request to risk initiative mitigation system 110 and receive mitigations back such as "Intent Requestor must conduct SCALE Review in conjunction with Compliance during delivery," "Initiative must ensure that the EMSS and LOB multilingual intent is evaluated to determine customer experiences and communications that are required in a foreign language," "Intent Requestor must contact [subject matter expert]." Mitigation engine 122 may determine subject-matter expert 104 to associate with the mitigation.

Notification engine 124 may generate various alerts and notifications within risk initiative mitigation system 110. For example, notification engine 124 may alert subject-matter expert 104 that intent requestor 102 submitted an initiative request that created a risk and mitigation to their area of expertise. Notification engine 124 may alert risk advisor 103 that a risk assessment needs approval.

Sentiment analyzer 126 may determine the tone, intent, or emotion in feedback provided by risk auditor 106 and/or in the qualitative data provided by intent requestor 102. For example, risk initiative mitigation system 110 may apply sentiment analysis to feedback provided by risk auditor 106 to extract a polarity of the feedback—e.g., whether the feedback is positive or negative. Similarly, sentiment analyzer 126 may determine a severity indicator that indicates the gravity of an error made by machine learning model 114. For example, if a very important risk was missed, risk auditor 106 may indicate, either expressly or through the use of strong qualitative language, the potential gravity of the missed risk. This severity indicator may apply weighting to the further training of the machine learning model. Sentiment analyzer 126 may further convert qualitative feedback provided by risk auditor 106 to a quantitative relevancy indicator that can be used to retrain machine learning model 114. Additionally, sentiment analyzer 126 may be employed to analyze the tone, intent, or emotion of the intake form, the answers to the questions, or other qualitative data provided by the intent requestor to determine additional or more accurate risks and mitigations.

Feedback interface 128 may allow risk auditor 106 to provide feedback to a generated risk assessment. In another embodiment, feedback interface 128 may employ various forms of supervised machine learning to allow risk auditor 106 to provide feedback on prior results. Feedback interface 128 may receive a relevancy indicator that quantitatively represents the relevance or irrelevance of the mitigation and risks to the initiative request. In one embodiment, the relevancy indicator may be received from risk auditor 106. In another embodiment, the relevancy indicator may be received from intent requestor 102. Feedback interface 128 may receive an accuracy indicator that quantifies the accuracy of the risks and mitigations created by the initiative request. For example, the accuracy indicator may be a score out of 100, a letter grade etc. Feedback interface 128 may allow risk auditor to add the relevancy indicator and/or accuracy indicator for each risk and for each mitigation. In another embodiment, the feedback may apply to the risk assessment as a whole. In another embodiment, feedback may be provided for both the risk assessment as a whole and the individual risks. Feedback interface 128 may allow risk auditor 106 to perform various other forms of data labeling of the inputs or outputs of a completed risk assessment.

Database 129 may house data used by risk initiative mitigation system 110. Database 129 may leverage a relational database, a NoSQL database or other horizontally scaling database, a digital ledger technology or blockchain, or any other suitable storage mechanism, or a suitable combination thereof. For instance, database 129 may harness any commercially available database management system to store and retrieve data. Database 126 may further be a message queue or stream processing platform such as Apache Kafka or Apache Spark or other data storage systems like Apache Hadoop, HDFS, or Amazon S3, to name just some examples. Database 129 may be a data lake, data silo, semi-structured data system (CSV, logs, xml, etc.), unstructured data system, binary data repository, or other suitable repository. Database 129 may store thousands, millions, billions, or trillions (or more) of objects, rows, transactions, records, files, logs, etc. while allowing for the creation, modification, retrieval, archival, and management of this data. In an embodiment, database 129 may use a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium.

Consumer facing applications 130 may be technical systems offered by an organization to customer 108. A change to consumer facing applications 130, e.g., to the software or environments used to provide the applications may create various risks to an organization, as described above. In one embodiment, risk initiative mitigation system 110 may store information about the applications offered by an organization, e.g., information about consumer facing applications 130 in database 129. Using this information, risk engine 120 may use natural language processing tools 116 to determine a subset of applications in consumer facing applications 130 potentially impacted by an initiative request. Risk initiative mitigation system 110 may associate this subset with the risks and mitigations generated in response to a novel initiative request. Information about consumer facing applications 130 may further be used to train machine learning model 114 to allow risk engine 120 to determine more robust risks specific to these technical systems.

FIG. 2A is an example screen display 200A of a summary screen in a risk initiative mitigation interface, according to some embodiments. The screen display provided in FIG. 2 is merely exemplary, and one skilled in the relevant art(s) will appreciate that many approaches may be taken to provide a suitable screen display 200A in accordance with this disclosure.

Initiative request interface 202 may provide a user interface in which members of an organization may perform tasks related to risk initiative analysis and mitigation. These tasks may vary by the type of user accessing initiative request interface 202. For example, intent requestor 102 may be able to create an initiative request, view past initiative requests, track changes to initiative requests, etc. Risk advisor 103 may be able to sign-off on the accuracy of risk assessments algorithmically generated by machine learning model 114 in response to initiative requests. Subject-matter expert 104 may be able to review the results of generated risks and mitigations that they are responsible for and collaborate with intent requestor 102. Risk auditor 106 may be able to provide feedback and train machine learning model 114.

Viewer 203A may reflect a user currently accessing initiative request interface 202. Here, viewer 203A is "Jane Doe," who may be an individual within an organization, e.g., intent requestor 102, risk advisor 103, subject-matter expert 104, risk auditor 106, or other suitable user. The functions provided by initiative request interface 202 may vary based on a user type associated with viewer 203A. For example, certain users in an organization may be limited to submitting initiative request and reviewing the generated risks and mitigations. Other users may have access to functions related to checking the results and providing further feedback to train machine learning model 114. Other users may be able to perform tasks related to training machine learning model 114, e.g., generating labeled data for use in training machine learning model 114. Other users may have access to aggregated reporting information about previous initiative requests.

Total initiatives 204 may be summary information indicating a number, count, or total of initiative requests processed by risk initiative mitigation system 110 in the past. Total initiatives 204 may represent a number of initiatives created by a particular user, e.g., viewer 203. For other users having higher privileges, total initiatives 204 may represent an aggregate number of initiatives processed within risk initiative mitigation system 110 as a whole.

Total risks 206 may be summary information indicating a number, count, or total of risks identified in response to risk initiatives completed in the past. Total risks 206 may represent a number of risks identified in response to initiatives undertaken by a particular user, e.g., viewer 203. For other users, total risks 206 may represent an aggregate number of risks identified within risk initiative mitigation system 110.

Total mitigations 208 may be summary information indicating a number, count, or total of mitigations identified in response to past initiative requests. Total mitigations 208 may represent a number of mitigations identified in response to initiatives undertaken by a particular user, e.g., viewer 203A. For other users, total mitigations 208 may represent an aggregate number of mitigations identified within risk initiative mitigation system 110.

Time saved 210 may represent an amount of time saved over legacy systems that do not employ machine learning to predict risks and mitigations when generating risk assessments and that, instead, rely on teams of risk advisors manually generating risk assessments. As discussed above, manually performing risk assessments based on an initiative requests may be extremely time consuming for a risk advisor or a team of risk advisors. By employing machine learning model 114 to immediately provide risks and mitigations in response to an intent request, enormous time savings may be realized. Accordingly, time saved 210 may thus reflect in a number of hours the time saved by employing the machine learning techniques. Time saved 210 may be an estimate generated by referencing the amount of time taken to conduct risk assessments in the past. The estimate for a particular initiative may vary on the nature of the initiative request (e.g., the complexity of the intake form, questions to answers, and presentation), by the number of risk and mitigations generated by the process, or any number of other suitable factors.

Results 211 may display a listing of past risk assessments completed within risk initiative mitigation system 110. Results 211 may represent results of initiative requests for a particular user, e.g., viewer 203. In the exemplary embodiment provided in 2A, for example, results 211 displays all past initiative requests completed by "Jane Doe," e.g., viewer 203. For other users, results 211 may represent all past assessments completed within risk initiative mitigation system 110. Results 211 may include all risk assessments or a subset thereof, e.g., displaying only a fixed number of assessments (e.g., ten) or assessments completed in a certain time frame (e.g., in the last thirty days). As indicated in FIG. 2A, the results may be partitioned into result sets with appropriate navigation buttons provided to allow users to traverse the results.

Risk column 212 may be included in results 211 and may display a count or other suitable indicator of a number of risks identified by the system in response to the initiative request. Results 211 may be sorted by risk column 212 to display initiative requests having the highest or lowest amounts of risk identified. In another embodiment, risk column 212 may list the text of the risks identified. Risk column 212 may allow viewer 203A to click on the risks identified to access the full list of risks identified in the assessment.

Product name 214 may be included in results 211 and may display a relevant product or product(s) related to the initiative request. In some embodiments, the product name may be submitted by intent requestor 102 in the intake form. In another embodiment, risk initiative mitigation system 110 may identify a subset of relevant consumer facing applications from consumer facing applications 130 potentially impacted by the initiative request. For example, natural language processing tools 116 may identify in the initiative request this subset by comparing to known information about consumer facing applications 130 as stored in database 129.

Submitters 216 may represent users within the organization that submitted an initiative request, e.g., intent requestor 102. In some embodiments, more than one user may be associated with the initiative request. In the exemplary embodiment in FIG. 2A, "Jane Doe" is a member of the submitters for each initiative request in results 211. Submission date 218 may be the date intent requestor 102 submitted each initiative request.

Figure 2B:
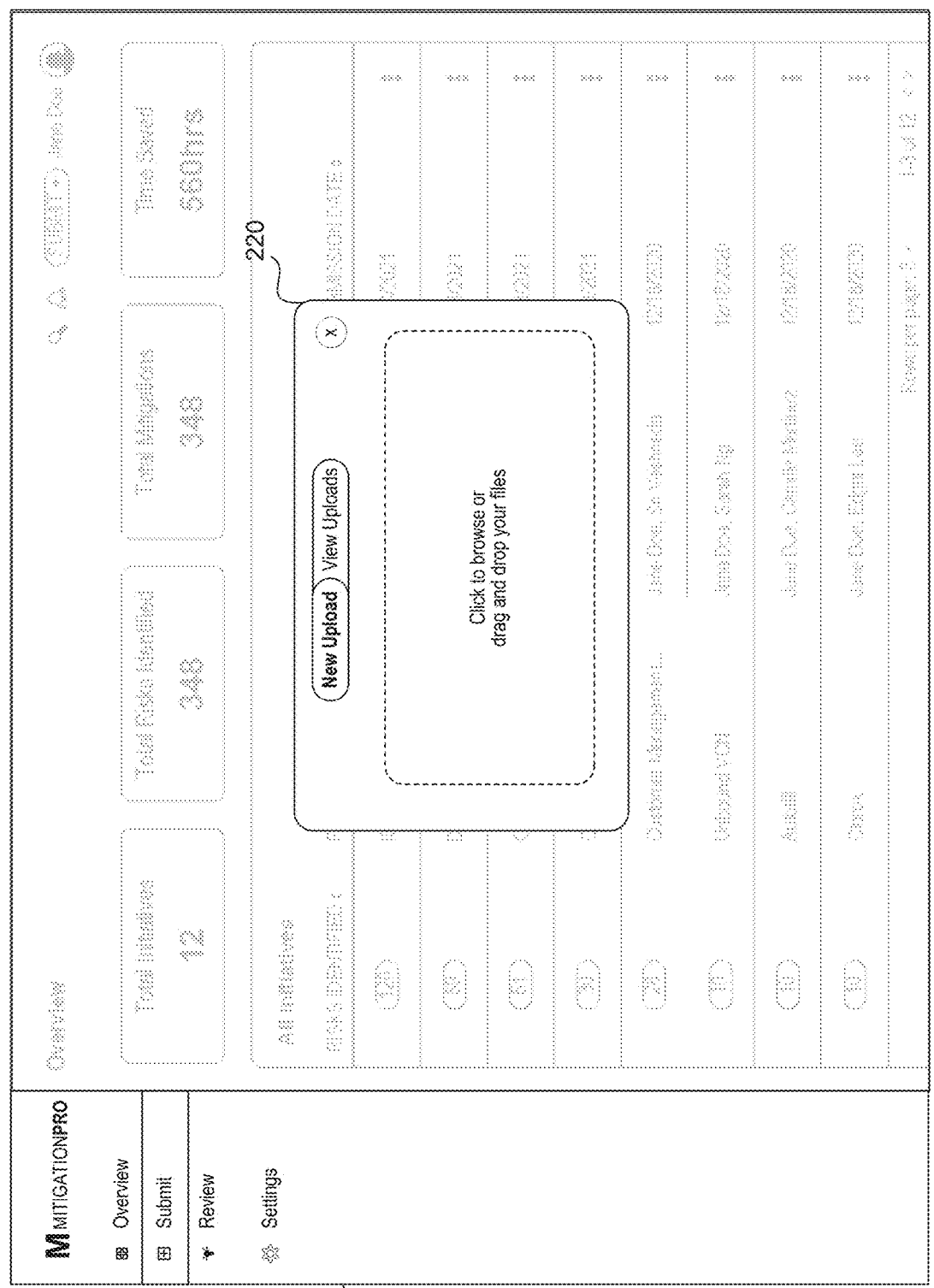
FIG. 2B is an example screen display of an upload screen for providing a novel initiative request in a risk initiative mitigation interface, according to some embodiments.

FIG. 2B is an example screen display 200B of an upload screen for providing a novel initiative request in a risk initiative mitigation interface, according to some embodiments. The screen display provided in FIG. 2 is merely exemplary, and one skilled in the relevant art(s) will appreciate that many approaches may be taken to provide a suitable screen display 200B in accordance with this disclosure.

Initiative request interface 202 may standardize the information that intent requestor 102 submits in an initiative request. In the exemplary embodiment portrayed in FIG. 2B, initiative request interface 112 provides upload tab 220 in response to a selection of "Submit" by viewer 203 in initiative request interface 202. Upload tab 220 may provide a location where viewer 203 may submit inputs materials needed to complete a risk assessment of the initiative request, as portrayed in further detail in FIG. 2C.

Figure 2C:
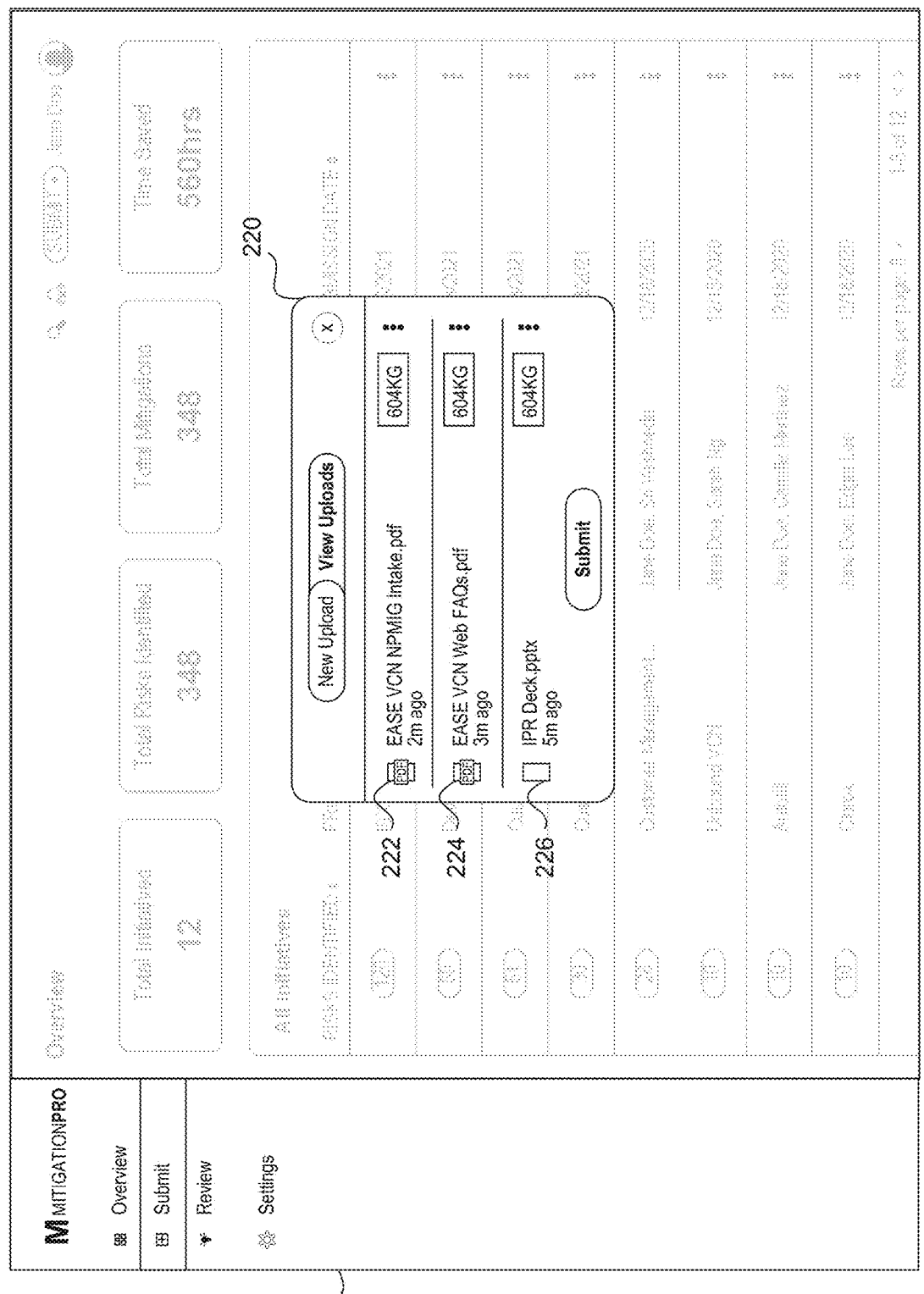
FIG. 2C is an example screen display of an upload screen having a novel initiative request submitted in a risk initiative mitigation interface, according to some embodiments.

FIG. 2C is an example screen display 200C of an upload screen having a novel initiative request submitted in a risk initiative mitigation interface, according to some embodiments. The screen display provided in FIG. 2 is merely exemplary, and one skilled in the relevant art(s) will appreciate that many approaches may be taken to provide a suitable screen display 200C in accordance with this disclosure.

In the exemplary embodiment portrayed in FIG. 2C, initiative request interface 112 displays upload tab 220 with materials relevant to an initiative request having been uploaded. In this embodiment, the materials include intake form 222, questions 224, and slide deck 226. Intake form 222 may include various qualitative, text-based fields provided by the intent requestor. Questions 224 may include standardized questions related to risk analysis with answers qualitatively provided by the intent requestor. Slide deck 226 may demonstrate the proposed initiative to the risk advisors in a concise, digestible, and presentable form. Upload tab 220 may include additional informational fields associated with each uploaded item, allow a user to print the document, etc.

Risk initiative mitigation system 110 may perform suitable error checking of the uploaded materials to ensure that the materials meet the requirements of the risk assessment process. For example, the system may ensure that all questions in questions 224 have been answered by intent requestor 102.

Figure 2D:
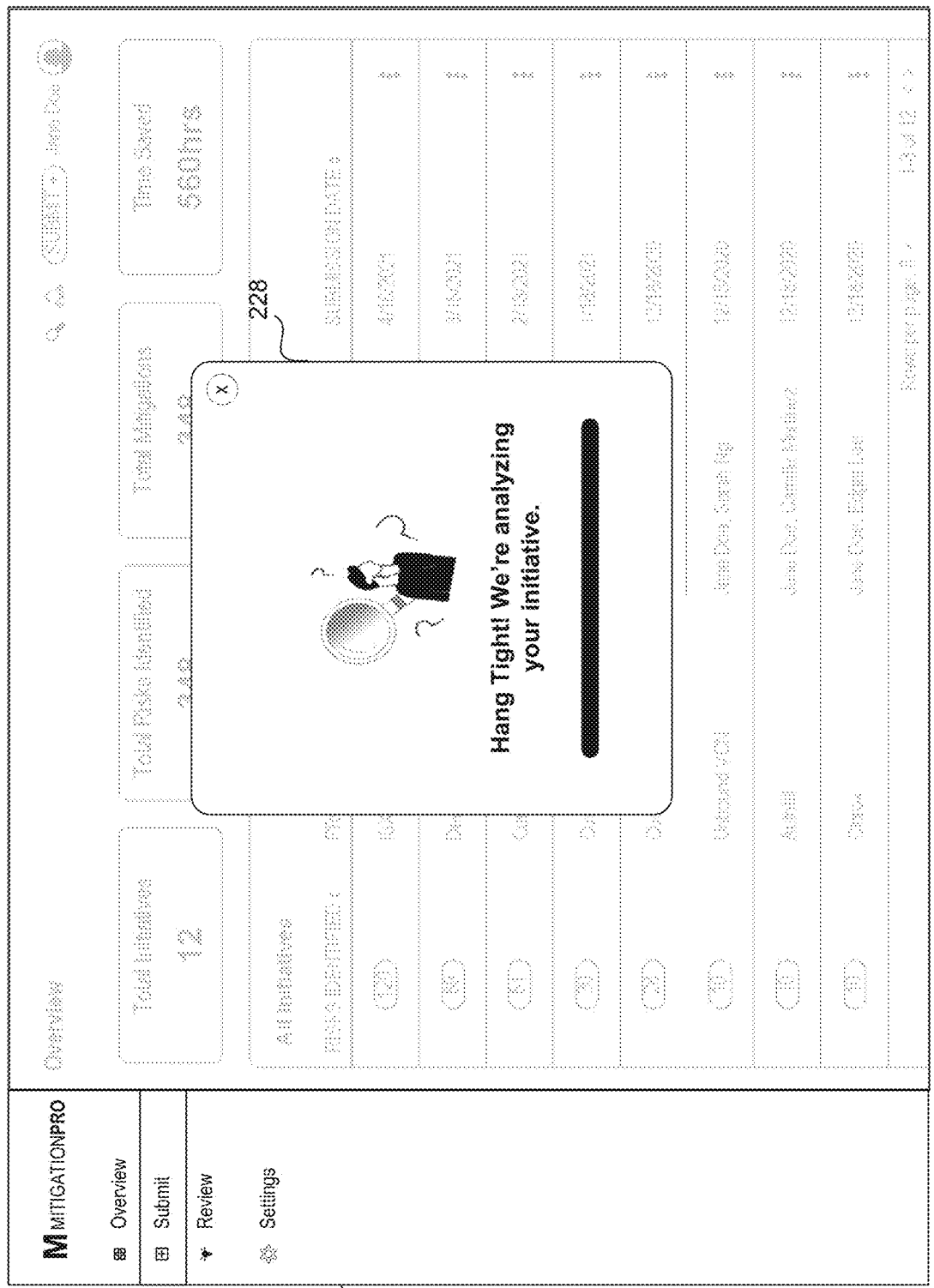
FIG. 2D is an example screen display of a processing screen in a risk initiative mitigation interface, according to some embodiments.

FIG. 2D is an example screen display 200D of a processing screen in a risk initiative mitigation interface, according to some embodiments. The screen display provided in FIG. 2 is merely exemplary, and one skilled in the relevant art(s) will appreciate that many approaches may be taken to provide a suitable screen display 200D in accordance with this disclosure.

Processing screen 228 may be displayed in initiative request interface 202 when intent requestor 102 submits the initiative request. Compared with legacy systems that may have taken days, weeks, or months to complete a risk assessment, processing screen 228 may display to viewer 103 briefly as machine learning model 114 programmatically generates appropriate results.

FIG. 2E is an example screen display 200E of a results screen provided to an intent requestor in a risk initiative mitigation interface, according to some embodiments. The screen display provided in FIG. 2 is merely exemplary, and one skilled in the relevant art(s) will appreciate that many approaches may be taken to provide a suitable screen display 200E in accordance with this disclosure.

In the exemplary embodiment portrayed in FIG. 2E, viewer 203A may have accessed a page from the results of a risk assessment may be viewed, e.g., via the "Review" tab in the menu on the left. Or viewer 203A may have clicked on a particular risk assessment in the Summary page exemplified in FIG. 2A to access details of a previously performed risk assessment. On such a page, initiative request interface 202 may display various fields related to a particular risk assessment performed by risk engine 120 and mitigations generated by mitigation engine 122. For example, FIG. 2E includes risks count 230, mitigations count 232, summary 233, risk 234, category 236, risk type 238, description 240, and mitigation 242.

Risks count 230 may be a count of the total number of risks identified by risk engine 120 when processing the initiative request using machine learning model 114. Mitigations count 232 may a count of the total number of mitigations identified by the performed risk assessment. In the exemplary embodiment in FIG. 2E, the number of mitigations and risks match. However, in other embodiments, the counts may not match— e.g., there may not be a one-to-one relationship and some risks may require multiple mitigations or no mitigations at all.

Summary 233 may provide a report of the auto-generated risk assessment. Summary 233 may display all of the risks identified by the risk assessment or a subset thereof with additional navigation buttons to allow viewer 203 to explore the results. Risk 234 may be a risk identified by the system. In FIG. 2E, this displays as a risk code, but in other implementations, this may be a risk narrative or other suitable identifier. Category 236 may be a category associated with risk 234. Here, the category may be "Risk" or "Impact," but other suitable approaches to categorizing the risk may be employed. For example, category 236 may be residual or inherent.

Risk type 238 may be a type of risk associated with risk 234. For example, risk type 238 may be one of compliance, legal, or operation. Other suitable approaches to subdivide risks into types may be undertaken within the scope of this disclosure. Description 240 may provide further description about risk 234.

Mitigation 242 may reflect a mitigation determined by the system. As displayed in FIG. 2E, this may associate subject-matter expert 104 with the mitigation and provide an indication of the actions that may need to be taken by intent requestor 102 in proceeding with the initiative.

Figure 2F:
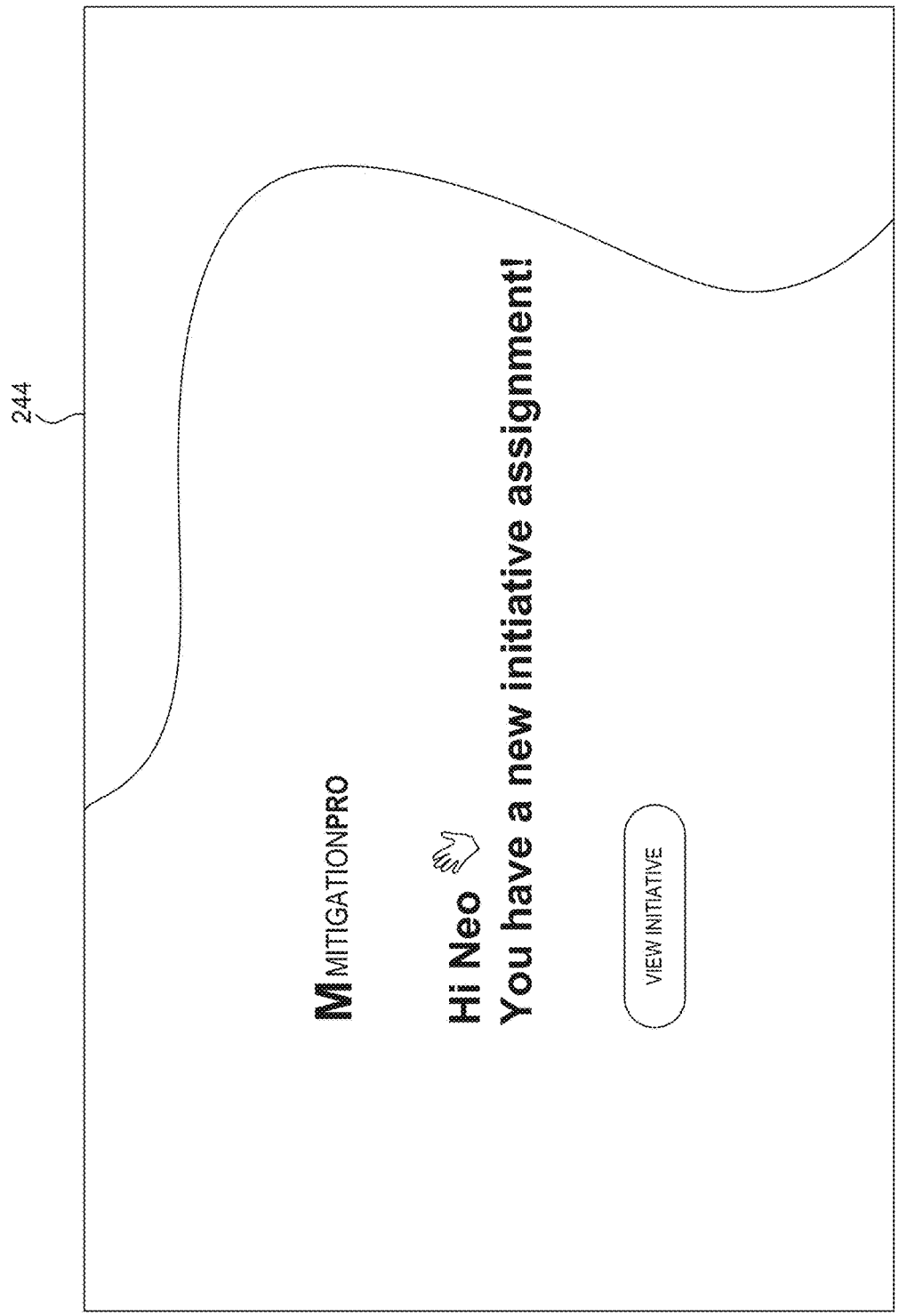
FIG. 2F is an example screen display of an alert in a risk initiative mitigation interface, according to some embodiments.

FIG. 2F is an example screen display 200F of an alert in a risk initiative mitigation interface, according to some embodiments. The screen display provided in FIG. 2 is merely exemplary, and one skilled in the relevant art(s) will appreciate that many approaches may be taken to provide a suitable screen display 200F in accordance with this disclosure.

Alert 244 may alert a user in the system of the completion of a risk initiative. For example, alert 244 may be sent to subject-matter expert 104 to alert the user that an initiative request was create by intent requestor 102 that needs to be reviewed.

FIG. 2G is an example screen display 200G of a review screen provided to a risk advisor or subject-matter expert in a risk initiative mitigation interface, according to some embodiments. The screen display provided in FIG. 2 is merely exemplary, and one skilled in the relevant art(s) will appreciate that many approaches may be taken to provide a suitable screen display 200G in accordance with this disclosure.

In exemplary screen display 200G, viewer 203B has changed to a reviewing user such as risk advisor 103. In this exemplary screen display, risk advisor 103 may review the risk assessment, e.g., the risks and the mitigations generated by risk engine 120 and mitigation engine 122 to ensure completeness and accuracy. Risk advisor 103 may also sign-off on or give approval to the risk assessment generated by risk engine 120.

Modify button 246 may allow subject-matter expert 104 or risk advisor 103 to update the risk assessment generated using machine learning model 114.

Figure 3:
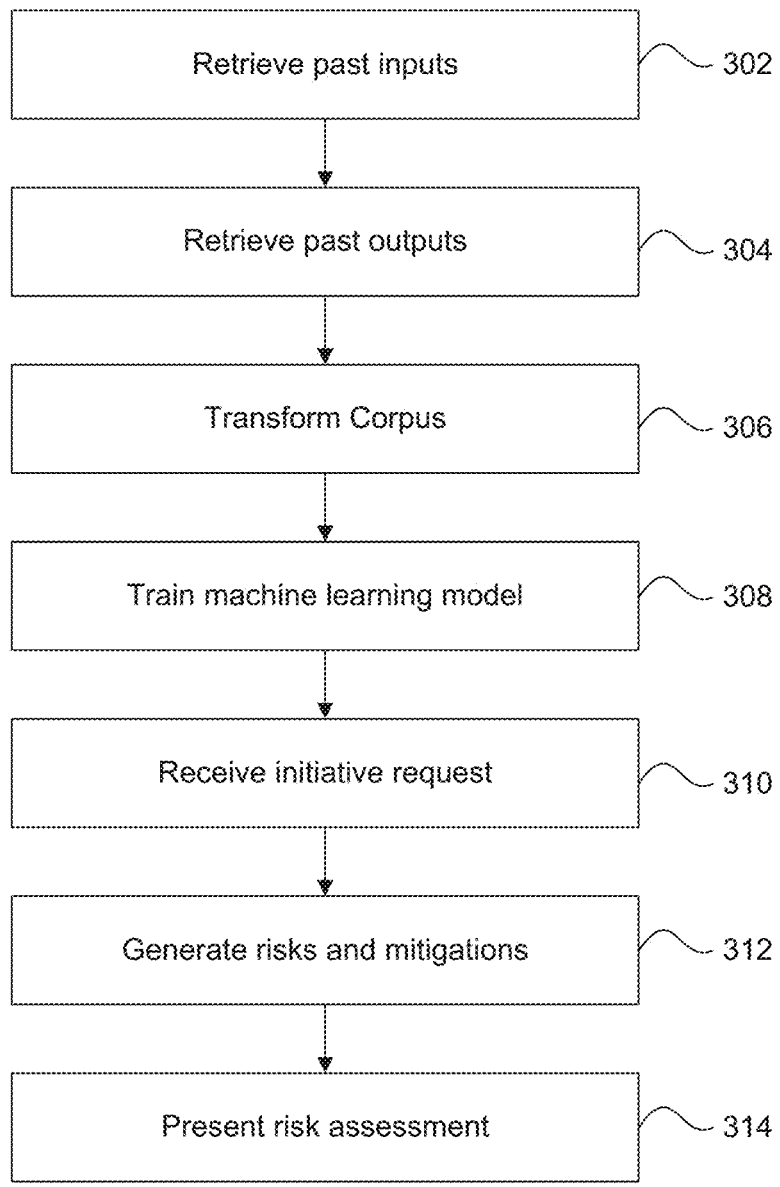
FIG. 3 is a flowchart illustrating a method of training a machine learning model to generate risks and mitigations in response to a received initiative request using a previously generated corpus of risk assessments, according to some embodiments.

FIG. 3 is a flowchart illustrating a method of training a machine learning model to generate risks and mitigations in response to a novel initiative request using a previously generated corpus of risk assessments, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, risk initiative mitigation system 110 may retrieve input materials submitted in previously processed initiative requests. For example, in a legacy system, an initiative requests may have been subject to a manual risk analysis process. This process may vet the impact of changes. When an individual conceives of a new initiative, the individual may submit input materials including an intake form, answers to questions, and a slide deck to a team of risk advisors. These text-based materials may form a corpus of text-based information that risk initiative mitigation system 110 may access. For example, records of past input materials may be stored on a file server, in a database, or other form accessible and retrievable for risk initiative mitigation system 110. In another embodiment, risk initiative mitigation system 110 may retrieve a combination of both input materials submitted manually and input materials uploaded to risk initiative mitigation system 110.

In 304, risk initiative mitigation system 110 may retrieve output materials generated in response to past initiative requests. These records may be stored on a file server, in a database, or other form accessible and retrievable for risk initiative mitigation system 110. These text-based materials may form a corpus of text-based information that risk initiative mitigation system 110 may access. In another embodiment, risk initiative mitigation system 110 may retrieve a combination of both risks and mitigations generated manually by teams of risk advisors and risk assessments programmatically generated by mitigation system 110. Moreover, risk initiative mitigation system 110 may associate these output materials with particular input materials retrieved in 302. Thus, risk initiative mitigation system 110 retrieves a large number of results—e.g., risk assessments indicating how past initiative requests were processed—both the input materials submitted by the intent requestor and the the known risks and mitigations that were generated as part of the process.

In 306, risk initiative mitigation system 110 may employ labeled data generator 118 to transform the input and outputs of past risk assessments retrieved in 302 and 304 for use in training machine learning model 114. Labeled data generator 118 may divide the corpus of materials into appropriate data sets, e.g., a training data set, a validation data set, and a test data set. In one embodiment, a trainer may employ labeled data generator 118 to tag samples or groups of samples within the retrieved materials with labels. For example, a trainer may tag a particular input or output or group of inputs or outputs as being accurate or inaccurate. A trainer may also tag particular input or output group with a severity indicator that indicates a gravity of the mistake. In another embodiment, labeled data generator 118 may employ natural language processing tools 116 to perform text-analyses of the input and output in the corpus of data. Using text-analyses, labeled data generator may determine conclusions about the input or output group and programmatically generate labeled data from unlabeled data to further transform the corpus for ingestion by the machine learning model in subsequent steps.

In 308, risk initiative mitigation system 110 may train machine learning model 114 to generate risks and mitigations in response to future initiative requests. Machine learning model 114 may be trained to provide immediate results in an initiative request process. Risk initiative mitigation system 110 may train machine learning model 114 using a variety of approaches within the context of this disclosure, e.g., machine learning model 114 may be a neural network or naïve Bayes classifier, a binary classification model, multiclass classification, or regression machine learning model. Risk initiative mitigation system 110 may employ both supervised and unsupervised learning techniques to generate more accurate assessments to initiative requests in the form of mitigations and risks created by a novel initiative request.

In 310, risk initiative mitigation system 110 may receive a novel initiative request—e.g., a never-before-seen set of intake materials such as an intake form, answered questions, and slide presentation. These materials may describe a change to existing technical systems, the release of new products, marketing initiatives and a wide array of other changes within an organization. Risk initiative mitigation system 110 may employ initiative request interface 112 (e.g., a graphical user interface akin to initiative request interface 202 exemplified above) to receive standardized information related to the initiative request. Initiative request interface 112 may require intent requestor 102 to submit an intake form, a number of questions and answers, and a slide presentation. Intent requestor 102 may submit an intake form that include qualitative, text-based fields. Intent requestor 102 may provide answers to standardized questions pertinent to risk analysis. Intent requestor 102 my provide a slide presentation that concisely demonstrates the proposed initiative. In some embodiments, only a subset of these materials may be required. In other embodiments, additional text-based materials may be required.

In 312, risk initiative mitigation system 110 may employ risk engine 120 and mitigation engine 122 to generate a risk assessment having risks and mitigations related to the novel initiative request. Risk engine 120 may leverage machine learning model 114 trained in 306 to determine risks associated with the novel initiative request. Mitigation engine 122 may determine mitigations, e.g., needed actions to perform based on the determined risks. These mitigations may differ depending on the risk, the organization, and other suitable factors. For some mitigations, the intent requestor may consult an expert (referred to below as "a subject-matter expert") to get additional information or clear the risk with this the subject-matter expert (either inside or outside of the organization). Other types of mitigation may involve removing portions of the initiative request when proceeding with the implementation, leveraging particular technical services in tandem with development, proposing particular technical courses for implementation (e.g., encryption or other data security technique), etc. In some instances, the initiative request may need to be revamped and rewritten to address the risks and mitigations and resubmitted. In one approach, risk engine 120 may employ machine learning model 114 and natural language processing tools 116 to recognize similarities in the language used in the novel initiative request to similarities in previously submitted input materials and provide similar risks and mitigations as provided in response to the previously submitted input materials.

In 314, risk initiative mitigation system 110, may present the determined risks and mitigations to intent requestor 102, risk advisor 103, and/or subject-matter expert 104, e.g., in a summary page. An exemplary approach to presenting the risks and mitigation is provided above with reference to FIGS. 2E and 2G. Additional information related to the risks may be provided including type, category, risk ID, descriptions, and other suitable information. This allows intent requestor 102 to receive immediate risks and mitigations based on their initiative request, to contact subject-matter expert 104, and to immediately tailor the implementation of the initiative in accordance with the risks and mitigations.

Figure 4:
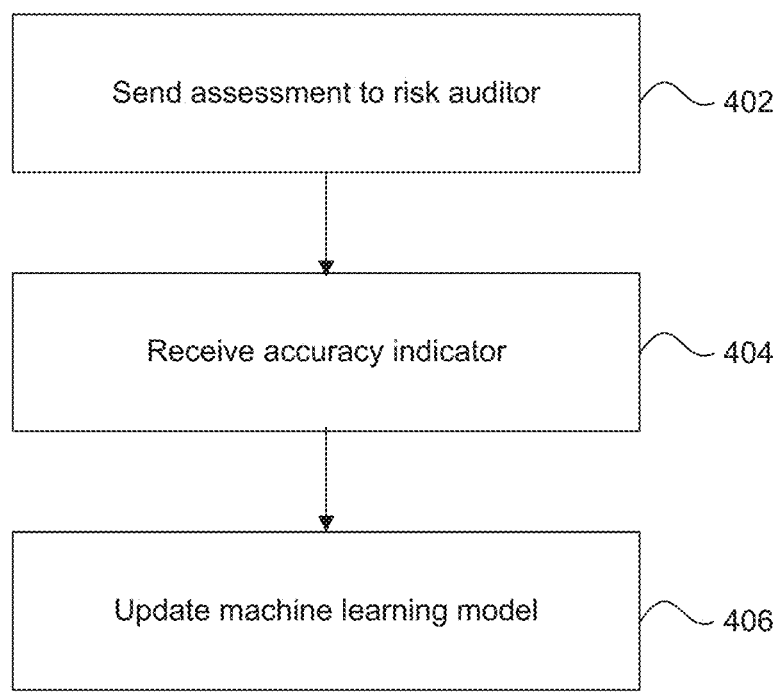
FIG. 4 illustrates method for updating a machine learning model based on an accuracy indicator provided by a risk auditor, according to some embodiments.

FIG. 4 illustrates method 400 for updating a machine learning model based on an accuracy indicator provided by a risk auditor, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, risk initiative mitigation system 110 may send a generated risk assessment of risks and mitigations to risk auditor 106 or otherwise alert risk auditor 106 as to the availability of the assessment in initiative request interface 112. For example, risk initiative mitigation system 110 may employ notification engine 124 to generate an alert such as the alert displayed above in FIG. 2F. Risk auditor 106 may then access initiative request interface 112 to review the generated risk assessment. Risk auditor 106 may ensure the accuracy of the risks and mitigations. Risk auditor 106 may also access and view the input materials provided in the novel initiative request.

In 404, risk initiative mitigation system 110 may receive additional feedback from risk auditor 106 with respect to the generated risks and mitigations. For example, risk initiative mitigation system 110 may receive a relevancy indicator that quantitatively represents the relevance or irrelevance of the mitigation and risks to the initiative request. In one embodiment, the feedback may be an accuracy indicator that that quantifies the success of risk engine 120 and mitigation engine 122 in identifying a complete and accurate set of risks and mitigations based on the initiative request. The feedback may also be a severity indicator that indicates the gravity of a mistake made by the machine learning model (e.g., if a severe risk was missed). The received feedback may further be accompanied by additional labeling of data by risk auditor 106. For example, risk auditor 106 may tag particular risks and mitigations as being accurate or inaccurate. Risk auditor 106 may also tag a risks and mitigations with severity indicators that indicate the gravity of a mistake. A suitable interface may be provided by risk initiative mitigation system 110 through which risk auditor 106 may generate the additional labeled data.

In 406, risk initiative mitigation system may retrain machine learning model 114 based on the feedback provided by the risk auditor to provide more accurate risks and mitigations in response to future initiatives. The received relevance, severity, and accuracy indicators may be used to generate updated labeled data for use in training the machine language model. In one embodiment, risk auditor 106 may provide feedback by categorizing the model-provided risks into relevant and irrelevant buckets. In another embodiment, risk auditor 106 may rate the model-provided risks on a relevance (e.g., 1-10, A-F, etc). In yet another embodiment, risk auditor 106 may add additional risks as input that the machine learning model 114 may have missed. These additional inputs may be used to retrain machine learning model 114 to generate more accurate risks and mitigations in the future.

Figure 5:
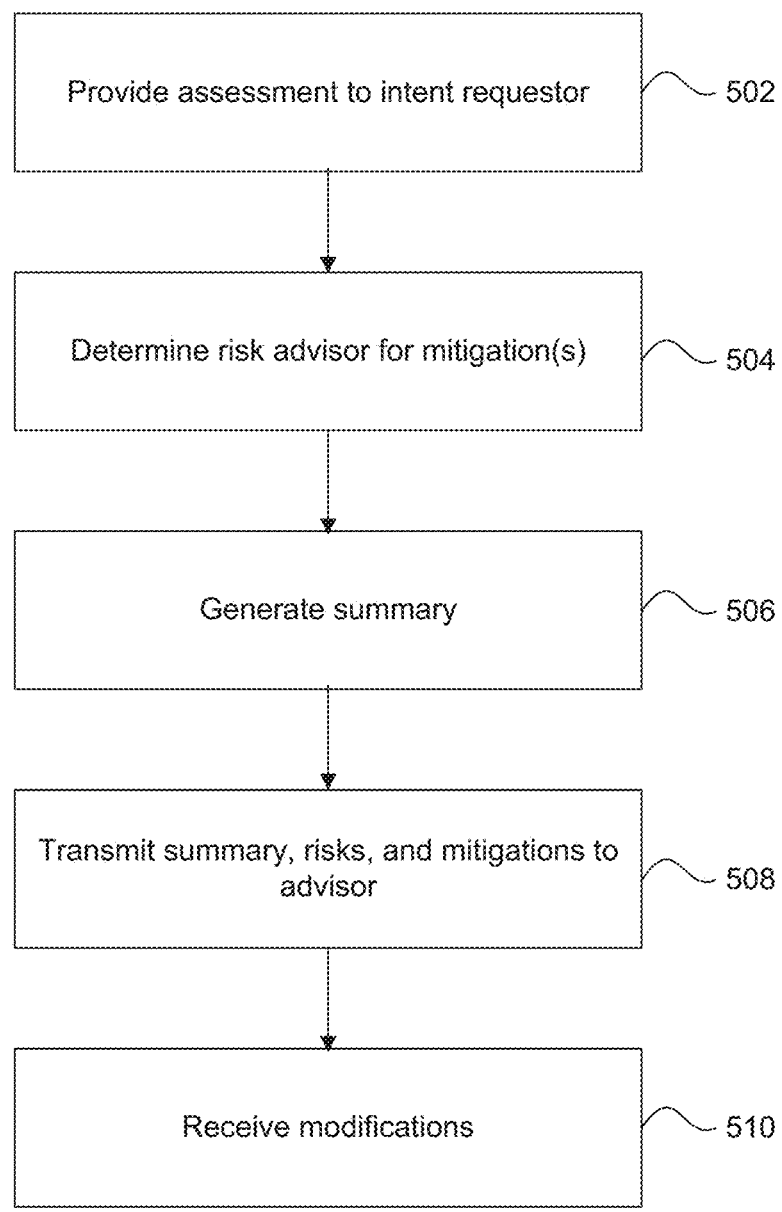
FIG. 5 is a flowchart illustrating a method of transmitting a risk and mitigation summary to a subject-matter expert for review, according to some embodiments.

FIG. 5 is a flowchart illustrating method 500 of transmitting a risk and mitigation summary to a subject-matter expert for review, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, risk initiative mitigation system 110 may present the determined risks and mitigations to intent requestor 102. Additional information related to the risks may be provided including type, category, risk ID, descriptions, and other suitable information. An exemplary approach to presenting the risks and mitigation is provided above with reference to FIGS. 2E and 2G. This allows intent requestor 102 to immediately view risks and mitigations based on their initiative request.

In 504, risk initiative mitigation system 110 may determine subject-matter expert 104 and/or risk advisor 103 to associate with each mitigation in the programmatically generated risk assessment. In one embodiment, risk initiative mitigation system 110 may retrieve a particular user from database 129, where database 129 stored an organizational hierarchy or other indications of what user is the subject matter expert responsible for each mitigation.

In 506, risk initiative mitigation system 110 may generate a summary of the initiative request. In one embodiment, risk initiative mitigation system 110 may aggregate the intake form and slide presentation received in the novel initiative request. In another embodiment, risk initiative mitigation system 110 may use natural language processing tools 116 to programmatically generate a summary of the initiative request.

In 508, risk initiative mitigation system 110 may present the risks and mitigations along with the summary generated in 506 to subject-matter expert 104 and/or risk advisor 103. Additional information related to the risks may be provided including type, category, risk ID, descriptions, and other suitable information. An exemplary approach to presenting the risks and mitigation is provided above with reference to FIG. 2G.

In 510, risk initiative mitigation system 110 may allow subject-matter expert 104 to provide additional modifications to the generated assessment. Risk initiative mitigation system 110 may allow risk advisor 103 review the generated assessment, confirm its accuracy, and sign-off on the generated risks and mitigations.

Figure 6:
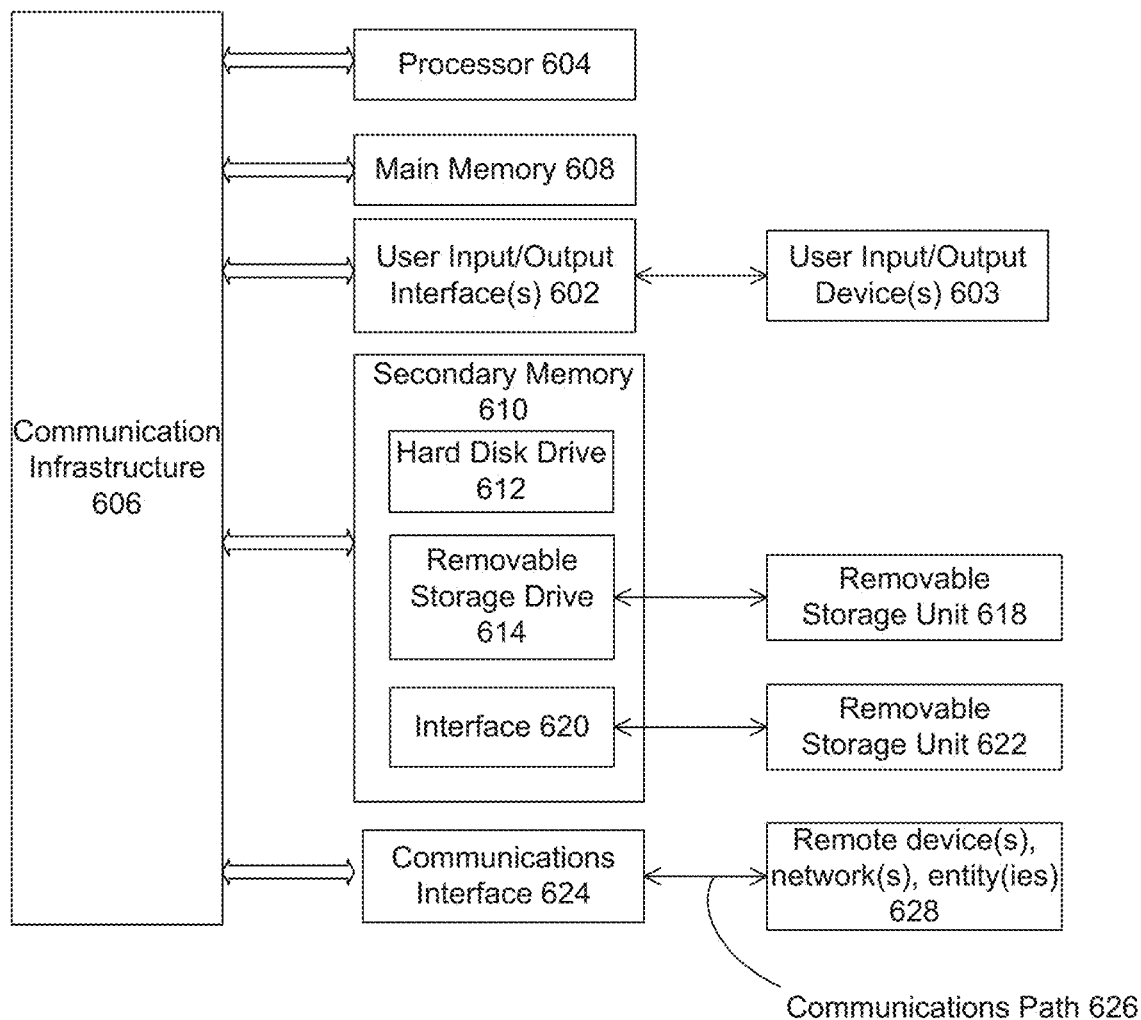
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    training a machine learning model with input materials and output materials from a plurality of prior risk assessments, wherein the input materials comprise text-based documents from prior manually processed initiative requests, the text-based documents comprising a plurality of intake forms, a plurality of answered questions, and a plurality of slide presentations, and wherein the output materials comprise risks and mitigations previously generated in response to the input materials;

generating, by one or more processors, using the machine learning model, a risk assessment for an initiative request received from an intent requestor, wherein the risk assessment comprises one or more risks and one or more mitigations;

displaying a risk assessment interface that presents summary information for the risk assessment, the one or more risks in association with the one or more mitigations, and a feedback interface that allows the intent requestor to provide feedback for each risk in the one or more risks;

receiving the feedback from the intent requestor, wherein the feedback comprises a relevancy indicator and an accuracy indicator; and retraining the machine learning model based on the relevancy indicator and the accuracy indicator to cause the machine learning model to provide more accurate results in response to a future initiative request.

2. The method of claim 1, further comprising:
identifying a risk auditor;
displaying the risk assessment interface to the risk auditor;
receiving additional feedback from the risk auditor; and
updating the machine learning model based on the additional feedback.

3. The method of claim 1, wherein the risk assessment further comprises a severity indicator associated with a risk in the one or more risks.

4. The method of claim 1, further comprising:
applying sentiment analysis to the feedback to extract a polarity of the feedback; and
generating the relevancy indicator based on the polarity.

5. The method of claim 1, further comprising:
determining, a risk advisor associated with a mitigation in the one or more mitigations;
generating a summary of the initiative request; and
displaying a summary page in the risk assessment interface to the risk advisor comprising the summary, the one or more risks, and the one or more mitigations.

6. The method of claim 1, wherein the relevancy indicator comprises a selection of relevant or irrelevant.

7. The method of claim 1, wherein the accuracy indicator quantifies the accuracy of the risk and comprises a numerical score or a letter grade.

8. A system, comprising:
a memory; and
at least one processor coupled to the memory and configured to:
train a machine learning model with input materials and output materials from a plurality of prior risk assessments, wherein the input materials comprise text-based documents from prior manually processed initiative requests, the text-based documents comprising a plurality of intake forms, a plurality of answered questions, and a plurality of slide presentations, and wherein the output materials comprise risks and mitigations previously generated in response to the input materials;
generate using the machine learning model, a risk assessment for an initiative request received from an intent requestor, wherein the risk assessment comprises one or more risks and one or more mitigations;
display a risk assessment interface that presents summary information for the risk assessment, the one or more risks in association with the one or more mitigations, and a feedback interface that allows the intent requestor to provide feedback for each risk in the one or more risks;
receive the feedback from the intent requestor, wherein the feedback comprises a relevance indicator and an accuracy indicator; and
retrain the machine learning model based on the relevancy indicator and the accuracy indicator to cause the machine learning model to provide more accurate results in response to future initiative request.

9. The system of claim 8, the at least one processor further configured to:
identify a risk auditor;
display the risk assessment interface to the risk auditor;
receive additional feedback from the risk auditor; and
update the machine learning model based on the additional feedback.

10. The system of claim 8, wherein the risk assessment further comprises a severity indicator associated with a risk in the one or more risks.

11. The system of claim 8, the at least one processor further configured to:
apply sentiment analysis to the feedback to extract a polarity of the feedback; and
generate the relevancy indicator based on the polarity.

12. The system of claim 8, the at least one processor further configured to:
determine a risk advisor associated with a mitigation in the one or more mitigations;
generate a summary of the initiative request; and
display a summary page in the risk assessment interface to the risk advisor comprising the summary, the one or more risks, and the one or more mitigations.

13. The system of claim 8, wherein the relevancy indicator comprises a selection of relevant or irrelevant.

14. The system of claim 8, wherein the accuracy indicator quantifies the accuracy of the risk and comprises a numerical score or a letter grade.

15. A non-transitory computer-readable device having instructions stored thereon that, when executed by at least one computing device, cause the at least one computing device to perform operations comprising:
training a machine learning model with input materials and output materials from a plurality of prior risk assessments, wherein the input materials comprise text-based documents from prior manually processed initiative requests, the text-based documents comprising a plurality of intake forms, a plurality of answered questions, and a plurality of slide presentations, wherein the output materials comprise risks and mitigations previously generated in response to the input materials;
generating, using the machine learning model, a risk assessment for an initiative request received from an intent requestor, wherein the input materials comprise text-based documents from prior manually processed initiative requests, and wherein the risk assessment comprises one or more risks and one or more mitigations;
displaying a risk assessment interface that presents summary information for the risk assessment, the one or more risks in association with the one or more mitigations, and a feedback interface that allows the intent requestor to provide feedback for each risk in the one or more risks;
receiving the feedback from the intent requestor, wherein the feedback comprises a relevancy indicator and an accuracy indicator; and retraining the machine learning model based on the relevancy indicator and the accuracy indicator to cause the machine learning model to provide more accurate results in response to a future initiative request.

16. The non-transitory computer-readable device of claim 15, the operations further comprising:
identifying a risk auditor;
displaying the risk assessment interface to the risk auditor;
receiving additional feedback from the risk auditor; and
updating the machine learning model based on the additional feedback.

17. The non-transitory computer-readable device of claim 15, wherein the risk assessment further comprises a severity indicator associated with a risk in the one or more risks.

18. The non-transitory computer-readable device of claim 15, the operations further comprising:
applying sentiment analysis to the feedback to extract a polarity of the feedback; and
generating the relevancy indicator based on the polarity.

19. The non-transitory computer-readable device of claim 15, the operations further comprising:
determining, a risk advisor associated with a mitigation in the one or more mitigations;
generating a summary of the initiative request; and
displaying a summary page in the risk assessment interface comprising the summary, the one or more risks, and the one or more mitigations.

20. The non-transitory computer-readable device of claim 15, wherein the relevancy indicator comprises a selection of relevant or irrelevant.

* * * * *